US011001099B2

(12) United States Patent
Hubert et al.

(10) Patent No.: US 11,001,099 B2
(45) Date of Patent: May 11, 2021

(54) WHEEL HUB ASSEMBLY HAVING DUAL ANGULAR POSITION SENSORS

(71) Applicant: Aktiebolaget SKF, Gothenburg (SE)

(72) Inventors: Mathieu Hubert, Ann Arbor, MI (US); Gene Kovacs, Brighton, MI (US); Michele Musso, South Lyon, MI (US); Lokesh Nagarajan, Northville, MI (US); David Christopher Rybski, White Lake, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/156,472

(22) Filed: Oct. 10, 2018

(65) Prior Publication Data

US 2019/0126677 A1 May 2, 2019

Related U.S. Application Data

(60) Provisional application No. 62/570,409, filed on Oct. 10, 2017.

(51) Int. Cl.
*B60B 27/00* (2006.01)
*B60B 27/02* (2006.01)
(Continued)

(52) U.S. Cl.
CPC .......... *B60B 27/0068* (2013.01); *B60B 27/02* (2013.01); *B60T 8/171* (2013.01);
(Continued)

(58) Field of Classification Search
CPC ... B60B 27/0068; B60B 27/02; F16C 41/007; G01D 5/245; B60T 8/171; B60T 8/176;
(Continued)

(56) References Cited

U.S. PATENT DOCUMENTS 7,164,265 B2 * 1/2007 Giai ........................ B60B 27/00
324/174
7,228,932 B2 * 6/2007 Rosenthal .............. B60K 28/10
180/271

(Continued)

FOREIGN PATENT DOCUMENTS

FR 2808325 B1 * 9/2002 ............. G01D 5/142
FR 2851650 A1 * 8/2004 ............. G01P 3/487

*Primary Examiner* — Xuan Lan Nguyen
(74) *Attorney, Agent, or Firm* — J-TEK Law PLLC; Scott T. Wakeman; Mark A. Ussai (57) ABSTRACT

A vehicle wheel hub assembly includes an outer member configured to be mounted to a non-rotatable portion of the vehicle and an inner member rotatably supported in the outer member by a bearing. An annular target body is coupled to the inner member. A first magnetic target track is disposed on the annular target body, and a first sensor is located adjacent to the first magnetic target track and configured to sense angular displacement of the first magnetic target track and to produce a first output signal. A second magnetic target track is disposed on the annular target body, and the second magnetic target track is spaced from the first magnetic target track. A second sensor is located adjacent to the second magnetic target track for sensing angular displacement of the second target track and is configured to produce a second output signal.

20 Claims, 5 Drawing Sheets

(51) Int. Cl.
*B60T 8/171* (2006.01)
*B60T 8/176* (2006.01)
*B60T 8/32* (2006.01)
*F16C 41/00* (2006.01)
*F16C 33/00* (2006.01)
*G01D 5/245* (2006.01)
*F16C 19/18* (2006.01)

(52) U.S. Cl.
CPC .............. *B60T 8/176* (2013.01); *B60T 8/329* (2013.01); *F16C 33/00* (2013.01); *F16C 41/007* (2013.01); *B60B 27/0005* (2013.01); *B60B 2380/12* (2013.01); *B60B 2900/50* (2013.01); *B60B 2900/511* (2013.01); *B60T 2240/00* (2013.01); *B60T 2270/10* (2013.01); *B60T 2270/416* (2013.01); *F16C 19/186* (2013.01); *F16C 2326/02* (2013.01); *G01D 5/245* (2013.01)

(58) Field of Classification Search
CPC .. B60T 8/329; B60T 2270/10; B60T 2240/00; G01P 3/443
See application file for complete search history.

(56) References Cited

U.S. PATENT DOCUMENTS

| | | | | |
|---|---|---|---|---|
| 7,265,537 B2 * | 9/2007 | Lutaud | ............... | G01D 5/34738 |
| | | | | 324/174 |
| 7,338,211 B2 * | 3/2008 | Bianco | ................. | F16C 19/186 |
| | | | | 384/448 |
| 7,553,087 B2 * | 6/2009 | Iwamoto | ............... | F16C 19/522 |
| | | | | 324/207.22 |
| 7,733,083 B2 | 6/2010 | Ozaki et al. | | |
| 8,002,475 B2 * | 8/2011 | Serafini | ................ | F16C 41/007 |
| | | | | 384/448 |
| 8,798,906 B2 * | 8/2014 | Shibata | .................. | G01P 3/489 |
| | | | | 701/300 |
| 8,950,339 B2 * | 2/2015 | Turmeau | ................... | B61F 5/28 |
| | | | | 105/218.1 |
| 2006/0245677 A1 * | 11/2006 | Kenworthy | ........... | F16C 19/522 |
| | | | | 384/448 |
| 2012/0105055 A1 | 5/2012 | Takahashi et al. | | |
| 2019/0322132 A1 | 10/2019 | Bertola et al. | | |

\* cited by examiner

WHEEL HUB ASSEMBLY HAVING DUAL ANGULAR POSITION SENSORS

CROSS-REFERENCE TO RELATED APPLICATIONS

The present application claims the benefit of U.S. Provisional Patent Application No. 62/570,409 filed on Oct. 10, 2017, the entire contents of which are hereby incorporated by reference.

TECHNOLOGICAL FIELD

The present disclosure is directed to a wheel hub assembly having improved wheel speed sensors and to an antilock braking system (ABS) including the wheel hub assembly, and, more specifically, to a wheel hub assembly having first and second wheel speed sensors configured to provide independent wheel speed signals and to an ABS system including the wheel hub assembly.

BACKGROUND

Wheel hub assemblies having wheel speed sensors are known. A conventional wheel hub assembly includes a fixed member and a rotatable member and a bearing that supports the rotatable member for rotation relative to the fixed member. In these assemblies, a sensor is mounted on the fixed member, and a target is mounted on the rotatable member. The target may comprise, for example, a plurality of circumferentially spaced magnetic poles, and the sensor may detect the movement of the magnetic poles past the sensor and produce an output signal each time a pole is sensed. The number of magnetic poles that are detected passing the sensor in a given time period can then be used to determine the speed of the wheel.

Signals from wheel speed sensors can be used for different purposes including for controlling a speedometer. These signals are also used for controlling antilock braking systems (ABS) and other traction and/or stability control systems which require accurate information about the speed of each vehicle wheel in order to control braking and/or power provided to each wheel. For example, during a braking operation, the ABS compares the signals from the wheel speed sensors of each vehicle wheel. If the ABS microprocessor sees the wheels are locked or turning at different speeds (skidding), it modulates the brakes in an effort to keep the all wheels rotating at the same rate. However, when a sensor produces an inaccurate signal, indicating for example, that one wheel is turning slower than the others, the ABS may release the brakes to that wheel even though braking is required. Similarly, erroneous sensor signals may prevent an ABS system from releasing braking when it is actually required. By keeping the wheels "unlocked" and then decelerating progressively, the braking distance is reduced.

Various environmental factors can damage the sensors and/or targets and lead to false readings. For example, even though the region around the sensors and targets is substantially sealed, road salt and/or excessive dirt or mud still may come between the sensor and the target and prevent the sensor from generating accurate readings. It would therefore be desirable to provide a wheel hub assembly that is capable of providing accurate information about the speed of each vehicle wheel even if a particular sensor and/or target is fouled or damaged.

SUMMARY

This problem and others are addressed by embodiments of the present disclosure, a first aspect of which comprises a vehicle wheel hub assembly that includes an outer member configured to be mounted to a non-rotatable portion of the vehicle and an inner member rotatably supported in the outer member by a bearing. The inner member is configured to support a vehicle wheel for rotation about a central axis of the bearing. The assembly also includes an annular target body coupled to the inner member for rotation with the inner member. The annular target body includes a first magnetic target track, and a first sensor is located adjacent to the first magnetic target track and configured to sense angular displacement of the first magnetic target track and to produce a first output signal. The annular target body also includes a second magnetic target track spaced from the first magnetic target track, and a second sensor is located adjacent to the second magnetic target track and configured to sense angular displacement of the second target track and to produce a second output signal.

Another aspect of the disclosure comprises an antilock braking system that includes the vehicle wheel hub assembly described above and a controller in communication with the first sensor and the second sensor that is configured to receive the first output signal and the second output signal and to control a brake member for braking the inner member relative to the outer member based on the first output signal and/or the second output signal. The controller is configured to generate a first speed signal indicative of a wheel rotation speed from the first output signal and to generate a second speed signal indicative of the wheel rotation speed from the second output signal and to generate an error signal when the first speed signal differs from the second speed signal by more than a predetermined amount.

A further aspect of the disclosure comprises a vehicle wheel hub assembly that includes an outer member configured to be mounted to a non-rotatable portion of the vehicle and an inner member rotatably supported in the outer member by a bearing. The inner member is configured to support a vehicle wheel for rotation about a central axis of the bearing. The assembly also includes a target coupled to the inner member for rotation therewith, and the target includes a first cylindrical portion having a first inner diameter and a flange extending radially outwardly from the first cylindrical portion. There is a first magnetic target track on the flange and a second magnetic target track on the flange or on the first cylindrical portion. A first sensor is mounted adjacent to the first magnetic target track for sensing angular displacement of the first magnetic target track and to produce a first output signal. A second sensor is located adjacent to the second target track and configured to sense angular displacement of the second target track and to produce a first second signal.

BRIEF DESCRIPTION OF THE DRAWINGS

The foregoing summary, as well as the detailed description of the preferred embodiments of the present invention, will be better understood when read in conjunction with the appended drawings in which.

DETAILED DESCRIPTION

Figure 1:
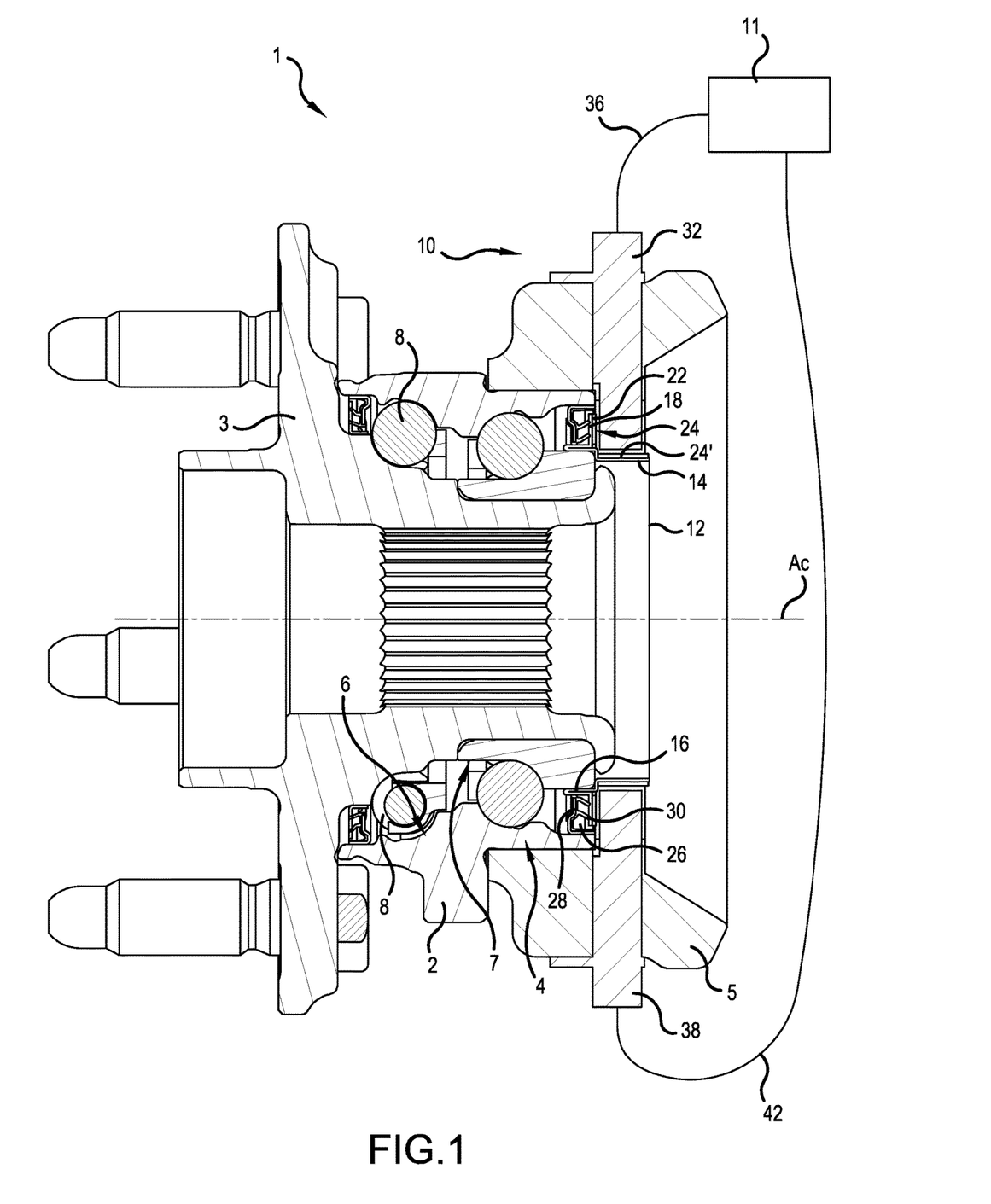
FIG. 1 is an axial cross-sectional view through a first portion of a wheel hub assembly according to the present disclosure having first and second sensors and an annular member having a first magnetic target track an a second magnetic target track.

Referring now to the drawings, wherein the showings are for purposes of illustrating embodiments of the present invention only and not for the purpose of limiting same, FIG. 1 shows a vehicle wheel hub 1 that includes an outer member 2, an inner member 3 and a bearing 4 that supports the inner member 3 for rotation relative to the outer member 2. The outer member 2 is connectable with a non-rotatable portion 5 of the vehicle, which may be, for example, a steering knuckle. The inner member 3 is connectable with a wheel (not illustrated) so as to be rotatable about a central axis AC. The bearing 4 includes at least one outer race 6 formed on or disposed about the inner member 3 and at least one inner race 7 disposed around the inner race 6 and a plurality of rolling elements 8 between the inner race and the outer race.

The wheel hub assembly also includes a sensor assembly 10 that is configured to communicate with a controller 11, which may comprise the control system for the vehicle or for an antilock brake system (ABS) and/or traction control system or other system in which wheel speed or total wheel revolutions are monitored, and to this end, the controller 11 may include or comprise a microprocessor, a microcontroller, an application-specific integrated circuit (ASIC), an integrated circuit (IC), a computer, a system-on-a-chip (SOC), a programmable logic element, or a field programmable gate array (FGPA) including a microprocessor.

Figure 4:
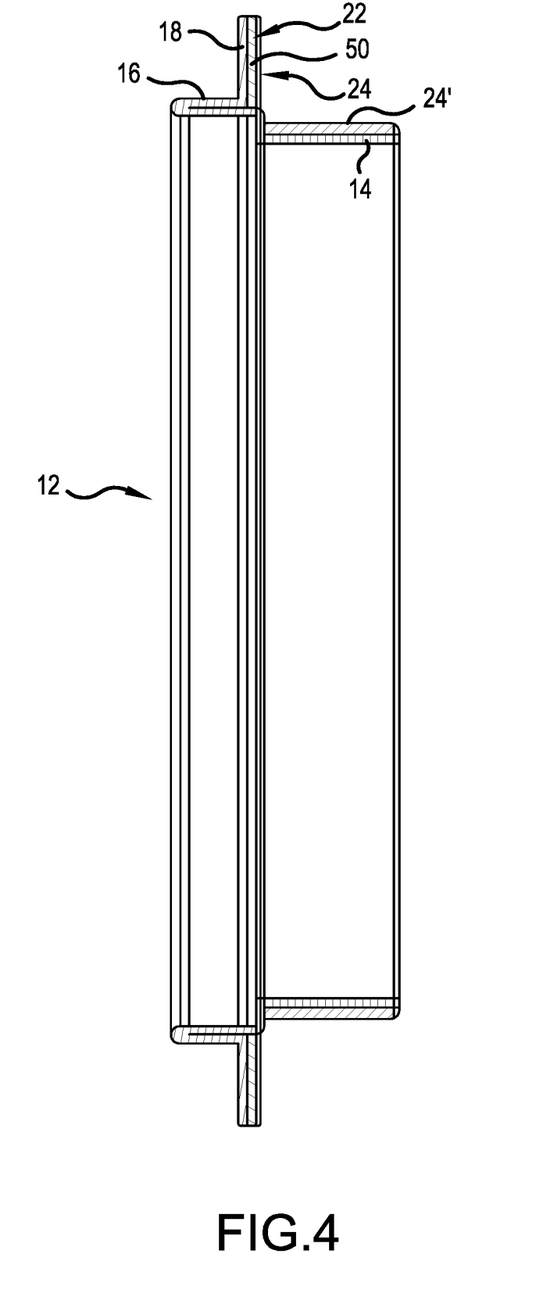
FIG. 4 is a sectional side elevational view of the annular target of FIG. 1.

The sensor assembly 10 includes an annular target 12, shown by itself in FIG. 4, and the annular target 12 includes a first cylindrical portion 14, a second cylindrical portion 16 and a radially outwardly extending flange 18 that projects from a portion of the second cylindrical portion 16. The first cylindrical portion 14 and the second cylindrical portion 16 and the radial flange 18 are preferably integrally formed, and the annular target 12 itself is preferably formed from a metal such as stainless steel, low-carbon steel or aluminum. The inner diameter of the second cylindrical portion 16 is configured such that it can be mounted on an axial end of the inner race 7 with a portion of the inner race 7 projecting into the second cylindrical portion 16.

The side of the flange 18 that faces toward the first cylindrical portion 14 includes a first magnetic target track 22 and, optionally, a second magnetic target track 24. In the alternative, the second magnetic target track 24' can be formed on the radially outer surface of the first cylindrical portion 16 instead of on the flange 18.

Referring again to FIG. 1, the annular target 12 is mounted on the inner race 7 such that the radial flange 18 forms a portion of a seal assembly 26 for the bearing 4. Specifically, the seal assembly 26 includes a seal element 28 having at least one seal lip 30, and the seal lip 30 is configured to slidingly engage the flange 18 on the side opposite the first magnetic target track 22. The flange 18 thus performs the dual roles of helping to seal the bearing 4 and supporting the first magnetic target track 22.

Figure 2:
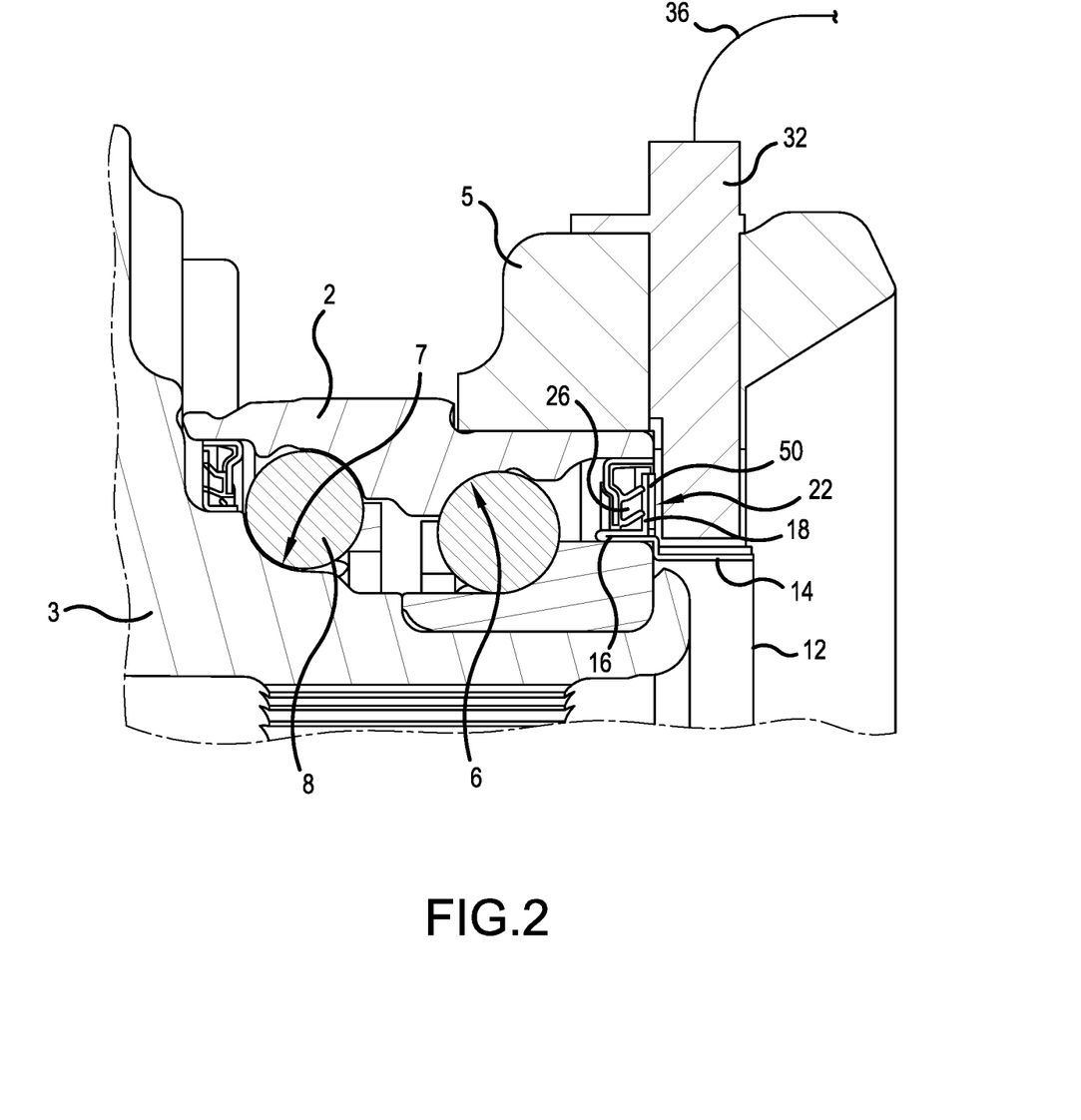
FIG. 2 is a detail view of the first magnetic target track and first sensor of FIG. 1 and a portion of a bearing seal assembly.
Figure 3:
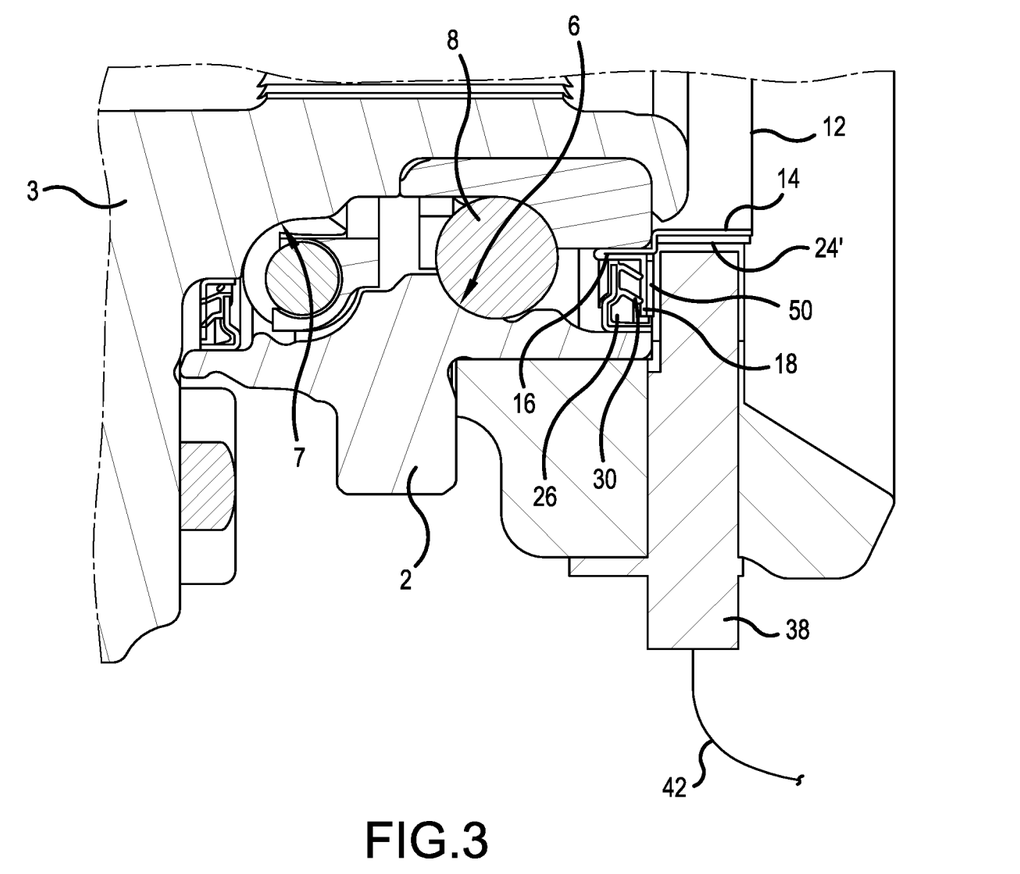
FIG. 3 is a detail view of the second magnetic target track and second sensor of FIG. 1 and a portion of the bearing seal assembly.
Figure 5:
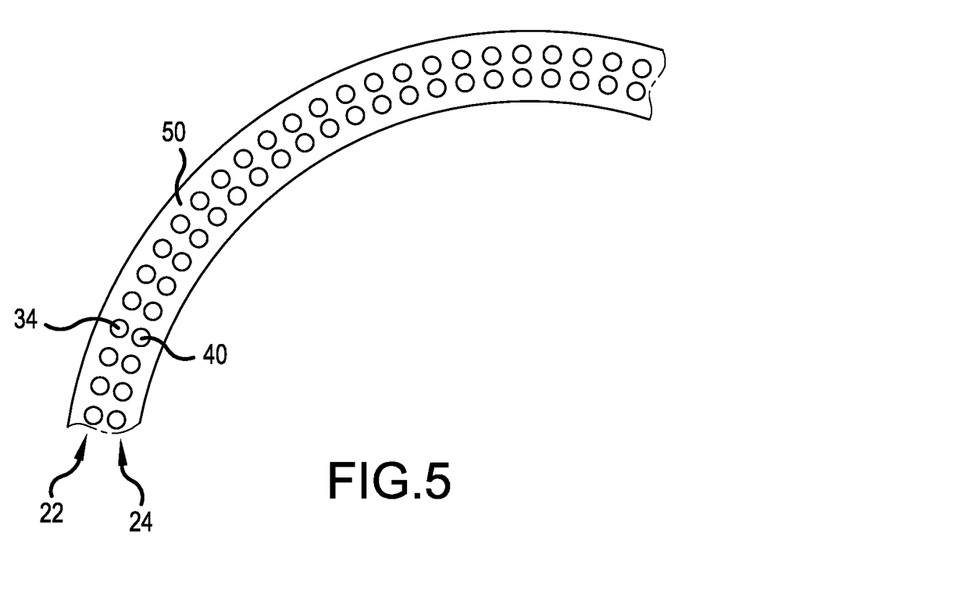
FIG. 5 is a side elevational view of a portion of the first and second magnetic target tracks of the annular target.

A first sensor 32 is mounted to the non-rotatable portion 5 of the vehicle adjacent to the flange 8 so that the first sensor 32 can sense the presence of the magnetic nodes 34 of the first magnetic target track 22 as they pass by the first sensor 32 and in response to sensing the passing magnetic nodes 34, produces a first output signal on a line 36 which is connected to the controller 11. A second sensor 38 is mounted to the non-rotatable portion 5 of the vehicle adjacent to the flange 18 at a location that is circumferentially offset from the first sensor 32 and is positioned such that the second sensor 38 senses the passage of the magnetic nodes 40 of the second magnetic target track 24 whether they are located on the flange 18, as illustrated in FIG. 5, or on the first cylindrical portion 14 of the target 12 as illustrated, for example, in FIGS. 1-3. The second sensor 38 produces a second output signal on line 42 which is also connected to the controller 11.

Furthermore, the annular target 12 preferably includes a relatively thin annular plate 50 formed of magnetic rubber (mix of magnetic material such as ferrite, rare earth (NdFeB, SmCo, SmFeN) with rubber such as HBR, NHBR, FKM) or of magnetic plastic (PA66, PA6, PPS, PPA), and the magnetic nodes 34 of the first magnetic target track 22 are formed on the plate 50. When the second magnetic target track 22 is also formed on the flange 18, the flange 18, the annular plate 50 also includes the second magnetic nodes 40. In the alternative, the second pattern of circumferentially spaced, discrete magnetic nodes 40 may be located on the first cylindrical portion 14 of the target 12. The rubber plate 50 is preferably molded to the flange 18, but may be bonded by an adhesive, attached by fasteners or connected by any other appropriate means.

Preferably, the first sensor 32 and the second sensors 34 each includes a Hall effect, Giant Magnetoresistance (GMR), Anisotropic Magnetoresistance (AMR), Tunnel Magneto Resistance (TMR) speed sensor, but may be any other appropriate type sensor capable of detecting rotation of the target first and second magnetic target tracks 22 and the second magnetic target track 24, such as for example coil based sensor. In 30 any case, each sensor 22, 24 is preferably configured to generate a series of electrical pulses as the inner member 3, and thus the target tracks 22, 24 angularly displace relative to the sensors first and second sensors 32, 38.

The controller 11 is configured to determine from the number of pulses produced by the first sensor 32 the angular rotation speed of the annular target 12 and thus of the inner member 2. Alternately, the first sensor 32 itself may include circuitry to determine the angular rotation speed of the annular target 12, and the first sensor 32 may send an output signal indicative of the rotational speed to the controller 11 instead of sending raw pulse information. In either case, the controller 11 determines from the data received from the first sensor 32 and the second sensor 38 whether the angular rotational speed indicated by the first sensor 32 is the same as the angular rotational speed indicated by the second sensor 38, at least within a predetermined error range, and the controller 11 produces an output indicative of a mismatch in the indicated rotational speeds.

This output may be used to generate a warning signal that one or both of the first and second sensors of a give wheel hub assembly are faulty. In the alternative, the controller 11 may compare the rotational speeds indicated by each sensor of a given wheel hub assembly to the rotational speeds of the remaining wheels on the vehicle (e.g., four total wheels in the case of an automobile) (not illustrated). If, for example the first sensor 32 of the wheel hub assembly 1 of the first vehicle wheel indicates a rotational speed of 100 RPM and the second sensor 38 of the wheel hub assembly 1 of the first vehicle wheel indicates a rotational speed of 200 RPM and the first and second sensors of the three remaining wheels all indicate wheel rotational speeds of approximately 200 RPM, the controller 11 will disregard the 100 RPM speed signal from the first sensor 32 and use only the signal from the second sensor 38 of the first vehicle wheel hub assembly 1. The system functions in a similar manner when no signal or a continuous signal is received from a particular sensor. If only one sensor were present on the given vehicle wheel, an ABS or traction control system might attempt to brake one or more wheels to equalize the speeds of the wheels.

The present invention has been described herein in terms of presently preferred embodiments. However, modifications and additions to these embodiments will become apparent to persons of ordinary skill in the art upon a reading of the foregoing description. It is intended that all such modifications and additions form a part of the present invention to the extent they fall within the scope of the several claims appended hereto.

We claim:

1. A vehicle wheel hub assembly comprising:
   an outer member configured to be mounted to a non-rotatable portion of the vehicle;
   an inner member rotatably supported in the outer member by a bearing, the inner member being configured to support a vehicle wheel for rotation about a central axis of the bearing;
   an annular target body coupled to the inner member for rotation with the inner member;
   a first magnetic target track disposed on the annular target body;
   a first sensor located adjacent to the first magnetic target track and configured to sense angular displacement of the first magnetic target track and to produce a first output signal;
   a second magnetic target track disposed on the annular target body, the second magnetic target track being spaced from the first magnetic target track;
   a second sensor located adjacent to the second magnetic target track and configured to sense angular displacement of the second target track and to produce a second output signal; and
   a controller in communication with the first sensor and with the second sensor and configured to receive the first output signal and the second output signal, to generate a first speed signal indicitave of a wheel rotation speed from the first output signal, to generate a second speed signal indicative of the wheel rotation speed from the second output signal and to generate an error signal when the first speed signal differs from the second speed signal by more than a predetermined amount.

2. The vehicle wheel hub assembly of claim 1, wherein the second magnetic target track is located radially inward of the first magnetic target track.

3. The vehicle wheel hub assembly of claim 1, wherein the first magnetic target track faces in an axial direction and is axially spaced from the first sensor and wherein the second magnetic target track faces in a radial direction and is radially spaced from the second sensor.

4. The vehicle wheel hub assembly of claim 1, wherein the annular body comprises a first cylindrical portion and a flange extending radially outwardly from an axial end of the first cylindrical portion and wherein the first magnetic target track is located on the flange and the second magnetic target track is located on the cylindrical portion.

5. The vehicle wheel hub assembly of claim 4, wherein the annular body includes a second cylindrical portion extending from the flange and away from the first cylindrical portion, the second cylindrical portion being mounted on the inner member such that a portion of an inner race of the bearing extends into the second cylindrical portion.

6. The vehicle wheel hub assembly of claim 5, wherein a diameter of the second cylindrical portion is greater than a diameter of the first cylindrical portion.

7. The vehicle wheel hub assembly of claim 6, wherein the first cylindrical portion, the second cylindrical portion and the flange are formed as a unitary member.

8. The vehicle wheel hub assembly of claim 4, including a seal element having at least one seal lip, wherein the seal lip presses against the flange to form a sliding seal with the flange.

9. The vehicle wheel hub assembly of claim 4, wherein the annular target body includes a layer of magnetic rubber or magnetic plastic and the first magnetic target track comprises a pattern of circumferentially spaced, discrete magnetic nodes formed on the layer of magnetic rubber or magnetic plastic.

10. The vehicle wheel hub assembly of claim 1, wherein the first sensor and the second sensor are each selected from the group consisting of a magnetic speed sensor, a Hall effect sensor and an optical sensor.

11. A vehicle wheel hub assembly comprising:
    an outer member configured to be mounted to a non-rotatable portion of the vehicle;
    an inner member rotatably supported in the outer member by a bearing, the inner member being configured to support a vehicle wheel for rotation about a central axis of the bearing;
    a target coupled to the inner member for rotation therewith, the target comprising:
    a first cylindrical portion having a first inner diameter and a flange extending radially outwardly from the first cylindrical portion,
    a first magnetic target track on the flange,
    a second magnetic target track on the flange or on the first cylindrical portion,
    a first sensor mounted adjacent to the first magnetic target track and configured to sense angular displacement of the first magnetic target track and to produce a first output signal;
    a second sensor located adjacent to the second target track and configured to sense angular displacement of the second target track and to produce a first second signal: and
    a controller in communication with the first sensor and with the second sensor and configured to receive the first output signal and the second output signal, to generate a first speed signal indicative of a wheel rotation speed from the first output signal, to generate a second speed signal indicative of the wheel rotation speed from the second output signal and to generate an error signal when the first speed signal differs from the second speed signal by more than a predetermined amount.

12. The vehicle wheel hub assembly of claim 11, further including a bearing seal, the bearing seal including at least one seal lip pressed against the first flange.

13. The vehicle wheel hub assembly of claim 12, wherein the target includes a second cylindrical portion on an opposite side of the flange from the first cylindrical portion, the second cylindrical portion having a second inner diameter larger than the first inner diameter.

14. The vehicle wheel hub assembly of claim 13, including a bearing inner race mounted on the inner member, wherein the second cylindrical portion is mounted on the bearing inner race such that a portion of the bearing inner race extends into the second cylindrical portion.

15. The vehicle wheel hub assembly of claim 14 wherein the first cylindrical portion, the second cylindrical portion and the flange are formed as a unitary member.

16. The vehicle wheel hub assembly of claim 11, wherein the first sensor is circumferentially offset from the second sensor.

17. The vehicle wheel hub assembly of claim 11 wherein the first sensor and the second sensor are each selected from the group consisting of a magnetic speed sensor, a Hall effect sensor and an optical sensor.

18. The vehicle wheel hub assembly of claim 15, wherein the first cylindrical portion, the second cylindrical portion and the flange are formed as a unitary member.

19. The wheel hub assembly of claim 1, wherein the controller is configured to control a brake member for braking the inner member relative to the outer member based on the first output signal and/or the second output signal.

20. The wheel hub assembly of claim 11, wherein the controller is configured to control a brake member for braking the inner member relative to the outer member based on the first output signal and/or the second output signal.

* * * * *